US007934530B2

(12) United States Patent
Uozumi et al.

(10) Patent No.: US 7,934,530 B2
(45) Date of Patent: May 3, 2011

(54) FILAMENT WINDING APPARATUS (75) Inventors: Tadashi Uozumi, Kyoto (JP); Motohiro Tanigawa, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 320 days.

(21) Appl. No.: 12/268,234

(22) Filed: Nov. 10, 2008

(65) Prior Publication Data

US 2009/0126875 A1 May 21, 2009

(30) Foreign Application Priority Data

Nov. 16, 2007 (JP) .................................. 2007-298704

(51) Int. Cl.
*B32B 37/00* (2006.01)
(52) U.S. Cl. ......... 156/432; 156/425; 156/428; 242/434
(58) Field of Classification Search .................. 156/425, 156/428–432, 441, 169–175, 180; 242/434–438
See application file for complete search history.

(56) References Cited

U.S. PATENT DOCUMENTS

| 4,077,828 A * | 3/1978 | Strom | ......................... 156/429 |
| 7,810,753 B2 * | 10/2010 | Uozumi et al. | ................ 242/444 |

| 2002/0069750 A1 * | 6/2002 | Uchida et al. | ..................... 87/33 |
| 2005/0211811 A1 * | 9/2005 | Weg | .............................. 242/159 |
| 2008/0197229 A1 | 8/2008 | Uozumi et al. | |

FOREIGN PATENT DOCUMENTS

| EP | 003 6447 A1 | 9/1981 |
| EP | 1574320 A1 | 9/2005 |
| EP | 1958758 A1 | 8/2008 |
| JP | 10-119138 | 5/1998 |
| JP | 2004-314550 | 11/2004 |

OTHER PUBLICATIONS

European search report for corresponding European application 08018513.5.

* cited by examiner

*Primary Examiner* — Khanh Nguyen
*Assistant Examiner* — John Blades
(74) *Attorney, Agent, or Firm* — DLA Piper LLP (US)

(57) ABSTRACT

A filament winding apparatus efficiently performs a helical winding process in which the winding angle of the fiber bundle differs. A helical winding head includes two guide rings, adjacently arranged along an axis center of the mandrel, and guide tubes arranged at equal intervals along a circumferential direction of the guide rings. The guide rings are switchable between a first state in which phase positions of the guide tubes are matched and a second state in which the phase positions of the guide tubes are evenly shifted in the circumferential direction by a phase switching structure. Tube exits of the guide tubes are arranged close in the first state.

11 Claims, 9 Drawing Sheets

FILAMENT WINDING APPARATUS

CROSS-REFERENCE TO RELATED APPLICATIONS

This application claims the benefit of priority under 35 USC 119 of Japanese application no. 2007-298704, filed on Nov. 16, 2007, which is incorporated herein by reference.

BACKGROUND OF THE INVENTION

1. Field of the Invention

The present invention relates to a filament winding apparatus equipped with a helical winding device.

2. Description of the Related Art

When forming a pressure container and the like through a filament winding method, a fiber bundle applied with resin is hoop wound or helical wound around a mandrel to form a reinforcement layer (see Japanese Laid-Open Patent Publication No. 10-119138 (paragraph 0002, FIG. 3)). A filament winding apparatus that guides numerous fiber bundles with a plurality of helical winding rings, and simultaneously winds a group of fiber bundles around the mandrel, is disclosed in Japanese Laid-Open Patent Publication No. 2004-314550 (paragraph 0019, FIG. 1). In Japanese Laid-Open Patent Publication No. 2004-314550, two helical winding rings are adjacently arranged along an axis center of the mandrel, and the group of fiber bundles fed through each ring is wound around the mandrel.

SUMMARY OF THE INVENTION

The winding process can be carried out in a shorter time such that the pressure container is more efficiently manufactured by simultaneously helical winding the group of fiber bundles around the mandrel in the above manner. In this regards, the time necessary for the winding process can be reduced by increasing the number of fiber bundles wound around the mandrel by helical winding.

However, a correlation exists between the winding angle of the fiber bundle and the number of windings when the diameter dimension of the mandrel and the average width dimension of the fiber bundle in an opening state are constant. For instance, numerous fiber bundles can be evenly wound around a mandrel of a certain diameter without overlapping each other if the winding angle is small. However, the appropriate number of fiber bundles to be evenly wound in a state where adjacent fiber bundles do not overlap each other decreases as the winding angle increases. A fiber bundle having the same number as in a case where the winding angle is small may be wound at a large winding angle ignoring the appropriate number, but in this case, bumps are formed on the surface of a wound layer, disorder occurs in the winding of the fiber bundle, and the strength thereof is decreased as a result. That is, wasteful consumption of the fiber bundle becomes inevitable.

For these reasons, the number of fiber bundles to be wound around the mandrel needs to be changed between a case where the winding angle is large and a case where the winding angle is small. However, it is very troublesome to change the arrangement when performing helical winding while changing the winding angle of the fiber bundle.

The present invention provides a filament winding apparatus including a plurality of guide rings that efficiently performs a helical winding process in which the winding angle of the fiber bundle differs, and appropriately forms a helical wound layer. The present invention also provides a filament winding apparatus that substantially matches the winding angles of a fiber bundle R supplied from a guide tube attached to each guide ring even if the winding angle of the fiber bundle R is large, and appropriately and efficiently forms a helical wound layer.

A filament winding apparatus of the present invention includes a helical winding device that winds a fiber bundle around a circumferential surface of a mandrel. The helical winding device includes a fixed frame arranged upstanding on a mount, and a helical winding head supported by the fixed frame. The helical winding head includes a plurality of guide rings adjacently arranged along an axis center of the mandrel and coupled in a relatively freely rotating manner in a circumferential direction, guide tubes arranged at equal intervals along the circumferential direction of the guide rings, and a phase switching structure rotating a guide ring on a movable side. The guide rings are switchable between a first state in which a phase position of the guide tubes are matched and a second state in which the phase positions of the guide tubes are evenly shifted in the circumferential direction by a phase switching structure. Tube exits of the guide tubes are arranged close along an axis center direction of the mandrel in the first state.

In one embodiment, one of the guide rings is fixed and supported at the fixed frame, and the other guide rings are coupled in a freely rotating manner in the circumferential direction with respect to the fixed and supported guide ring. The phase switching structure includes an operator switching one of the guide rings that can be rotatably displaced, and a positioning structure arranged between the adjacent guide rings.

In one embodiment, the guide tube is formed to a linear tubular form and is attached and fixed to each guide ring. The guide tubes are tilted so that the tube exits are arranged close.

In the present invention, the helical winding head is configured by a plurality of guide rings adjacently coupled in a relatively freely rotating manner, guide tubes arranged along the circumferential direction of the guide rings, and a phase switching structure rotating a guide ring on a movable side. The guide ring on the movable side can be switched by the phase switching structure between a first state in which phase positions of the guide tubes are matched and a second state in which the phase positions of the guide tubes are evenly shifted in the circumferential direction.

According to the filament winding apparatus of the present invention, the number of fiber bundles R supplied from the helical winding head 21 can be changed every time the winding angle of the fiber bundle R is differed by switching the guide rings between the first and second states with the phase switching structure. Therefore, a helical winding process in which the winding angle of the fiber bundles is different can be efficiently carried out, and the helical wound layer can be appropriately formed while avoiding wasteful consumption of the fiber bundle even if the winding angle of the fiber bundle R is large. The trouble of changing the arrangement is advantageously excluded since a0. Helical winding process of different winding angles can be continuously carried out.

In the present invention, the tube exits of the guide tubes are arranged close along the axis center direction of the mandrel in the first state. Thus, the winding angle of the fiber bundle R supplied from each guide tube can be substantially matched, and the helical wound layer can be appropriately and efficiently formed even in a state where the winding angle of the fiber bundle R is large.

According to the helical winding head in which one of the guide rings is fixed and supported at the fixed frame, and the other guide rings are coupled in a freely rotating manner in the circumferential direction with respect to the fixed and supported guide ring, the supporting structure of each guide ring is simplified. For instance, when configuring the helical winding head with two guide rings, one guide ring is fixed and supported, and the remaining guide ring is coupled in a relatively rotatable manner with respect to the former guide ring, so that the movable portion is limited to one guide ring.

When the phase switching structure is configured by an operator switching one of the guide rings that can be rotatably displaced, a positioning structure arranged between the adjacent guide rings, the rotation limit of the guide ring on the movable side can be defined by the positioning structure. Therefore, the switching function by the operator and the positioning function by the positioning structure are performed individually, and the structure of the phase switching structure is simplified, but nevertheless, the guide ring can always be accurately switched.

According to the helical winding head in which a guide tube having a linear tubular form is attached and fixed to each guide ring, and the guide tube attached to at least one guide ring is tilted so that the tube exits are arranged close, the attachment structure of the guide tube and the structure of the helical winding head are simplified. Thus, troubles in processing the guide rings and in assembly and maintenance/repair are reduced. For instance, if a middle part of the guide tube is bent to a dogleg shape to closely arrange the tube exits, the fixed structure with respect to each guide ring of the guide tube becomes complicating, and a great amount of trouble is inevitable for processing and assembly or maintenance/repair.

Other features, elements, processes, steps, characteristics and advantages of the present invention will become more apparent from the following detailed description of preferred embodiments of the present invention with reference to the attached drawings.

DETAILED DESCRIPTION OF EMBODIMENTS OF THE INVENTION

Example

Figure 2:
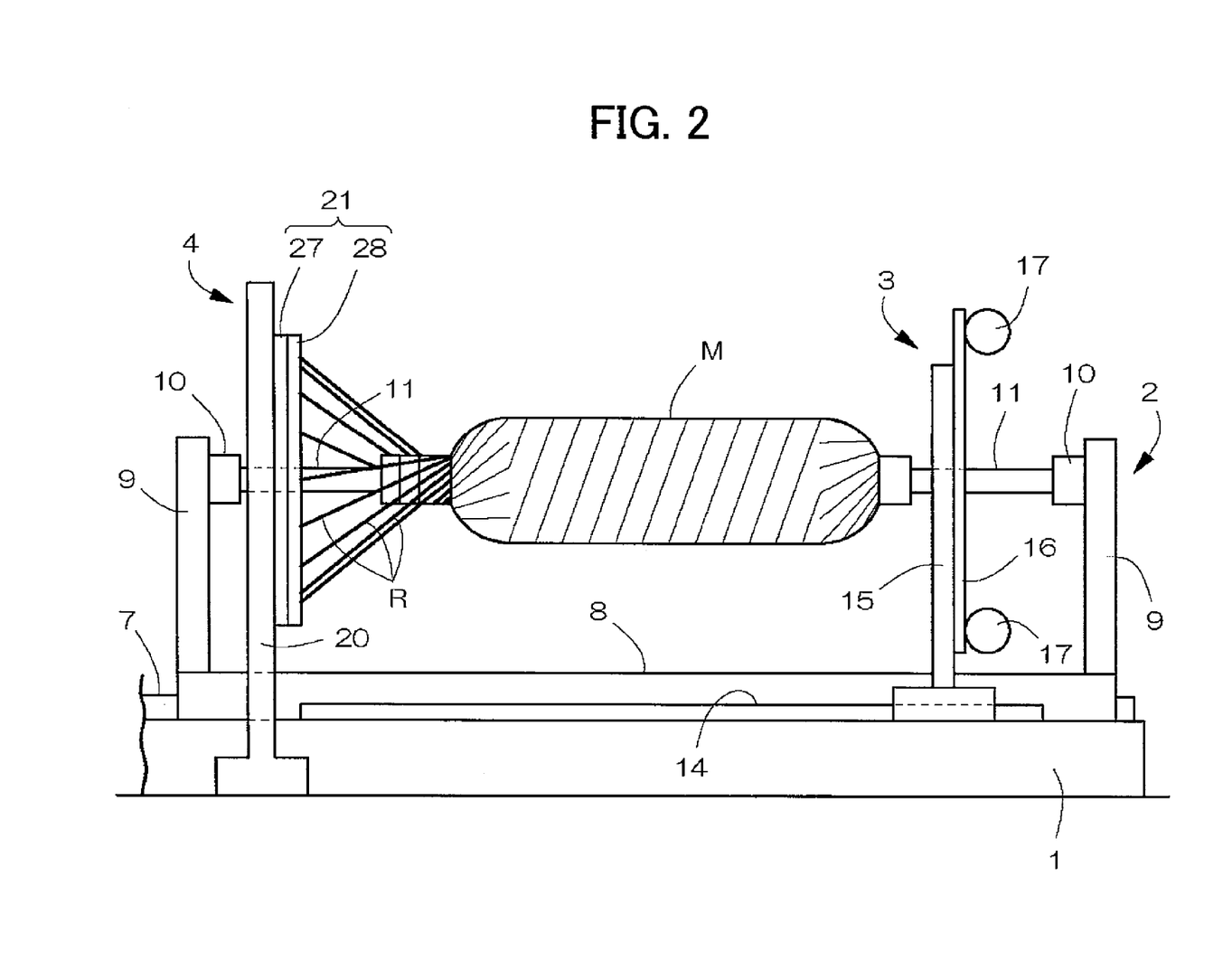
FIG. 2 is a front view of a filament winding apparatus according to the present invention.

FIG. 1-8 show an example of a filament winding apparatus according to the present invention comprising a fiber bundle supply structure and a winding device. The winding device comprises a supporting board 2 that is arranged on an upper part of a mount 1 that extends lengthwise in a left and right direction and that supports a mandrel M; a hoop winding device 3; a helical winding device 4; and a mandrel replacing device. The supporting board 2 and the hoop winding device 3 are driven by a drive mechanism in a reciprocating manner along a longitudinal direction of the mount 1. The helical winding device 4 is fixed at a central position of the mount 1, and feeds and guides a fiber bundle R from a group of creels supported by the fiber bundle supply structure to the mandrel M.

Where the final product is a pressure container, the mandrel M includes a metal container made of high strength aluminum material, stainless material, or the like. The mandrel M may alternatively be a plastic container. As shown in FIG. 2, the mandrel M integrally includes a middle cylindrical part, a dome part continuing at left and right ends of the cylindrical part, and a mouth part projecting from the apex of the dome part. The fiber bundle R includes a bundle of glass or carbon fibers wound around a creel and impregnated in advance with a thermosetting plastic material. The fiber bundle R fed from the creel may be impregnated with resin, and then fed to the helical winding device 4.

The supporting board 2 comprises a base 8 moved and guided by front and back rails 7 of the mount 1, supporting arms 9 upstanding at both side ends of the base 8, and a chuck 10 arranged on opposing faces at the upper ends of the supporting arms 9. A pair of attachment jigs 11 fixed on the left and right sides of the mandrel M are gripped and fixed by the chuck 10 to support the mandrel M between the left and right supporting arms 9. One chuck 10 is rotatably driven by a drive structure to rotate the mandrel M. The supporting arms 9 are able to lie down from a standing orientation to a lying orientation with respect to the base 8 to facilitate replacement of the mandrel M.

The hoop winding device 3 comprises a frame 15 moved and guided by a rail 14 on the mount 1 and a disc-shaped wrapping table 16 supported in a freely rotating manner by the frame 15 and rotatably driven by a drive mechanism. A plurality of bobbins 17 supplying the fiber bundle in hoop winding are arranged at equal intervals along the circumferential edge of one side of the wrapping table 16. A circular opening allowing reciprocating movement of the mandrel M is formed at a middle of the plate surface of the wrapping table 16. A hoop wound layer is formed on the circumferential surface of the mandrel M by reciprocating the hoop winding device 3 while rotatably driving the wrapping table 16 with the opened surface of the opening and the mandrel M orthogonal to each other.

Figure 3:
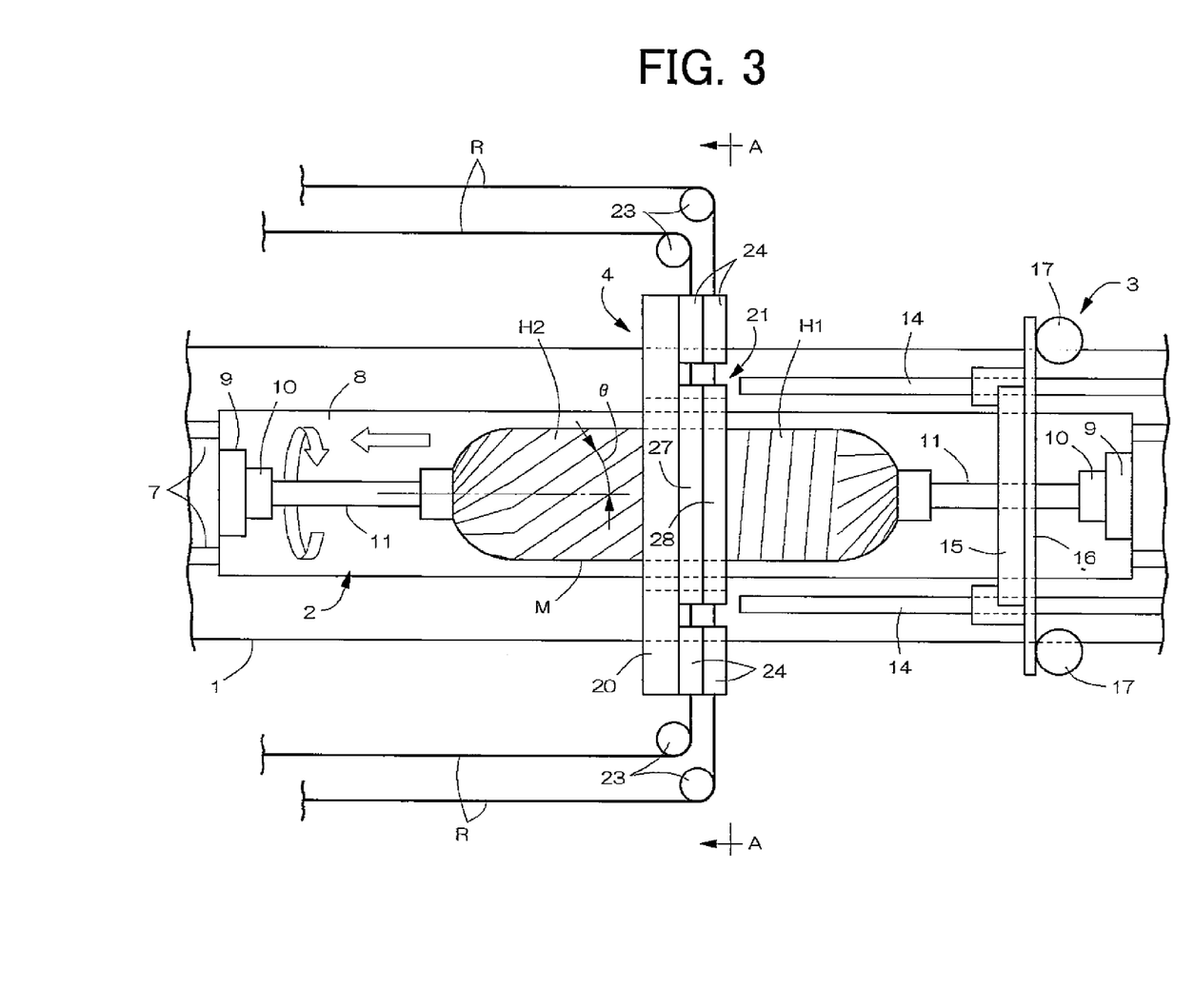
FIG. 3 is a plan view of the filament winding apparatus.
Figure 4:
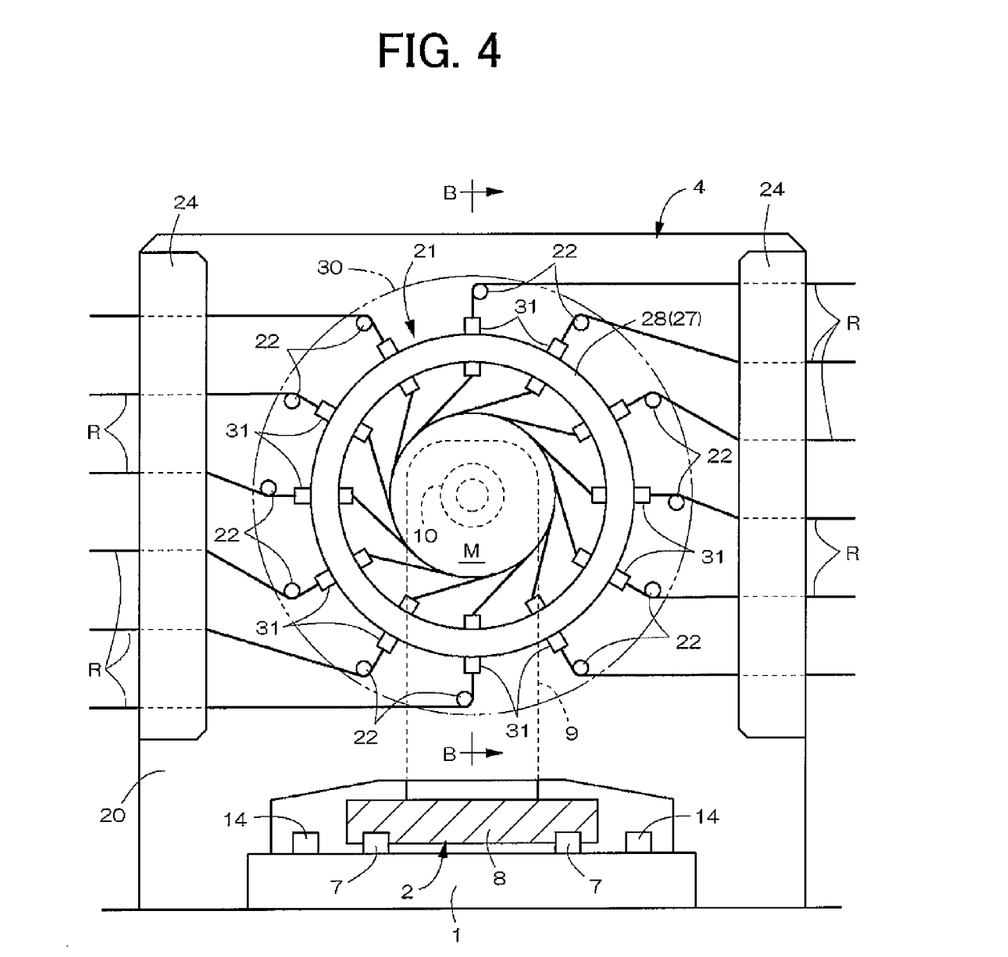
FIG. 4 is a cross-sectional view taken along line A-A of FIG. 3.

As shown in FIGS. 2-4, the helical winding device 4 comprises a fixed frame 20 upstanding on the mount 1, a helical winding head 21 supported by the fixed frame 20, and a guide roller (guide structure) 22 that changes a direction of and guides a group of fiber bundles towards the helical winding head 21. A circular opening 20a allowing reciprocating movement of the mandrel M is formed at a middle of the plate surface of the fixed frame 20 (FIG. 5), and the guide roller 22 is arranged on the plate surface at the periphery of the opening 20a. The fiber bundle R is guided by a direction-changing roller 23 arranged on front and back sides of the fixed frame 20, and is then fed to the helical winding head 21 through a tension adjustment structure 24. The tension adjustment structure 24 is arranged in pairs on front and back sides of the fixed frame 20 in correspondence to left and right guide rings 27, 28 (FIG. 3).

The helical winding head 21 comprises the adjacently arranged guide rings 27, 28, a group of guide tubes 31 arranged at equal intervals along the circumferential direction of each guide ring 27, 28, and a phase switching structure 32 rotatably operating the guide ring 28 on a movable side. In this example, twelve guide tubes 31 are shown as attached to each guide ring 27, 28 to simplify the drawing. In actual practice, however, several dozens to a hundred and several tens of the group of guide tubes 31 are attached to the guide rings 27, 28. The appropriate number of fiber bundles R for carrying out helical winding is calculated using as variables the diameter dimension of the mandrel M, and the winding width and angle (θ in FIG. 3) of the fiber bundle R.

Figure 5:
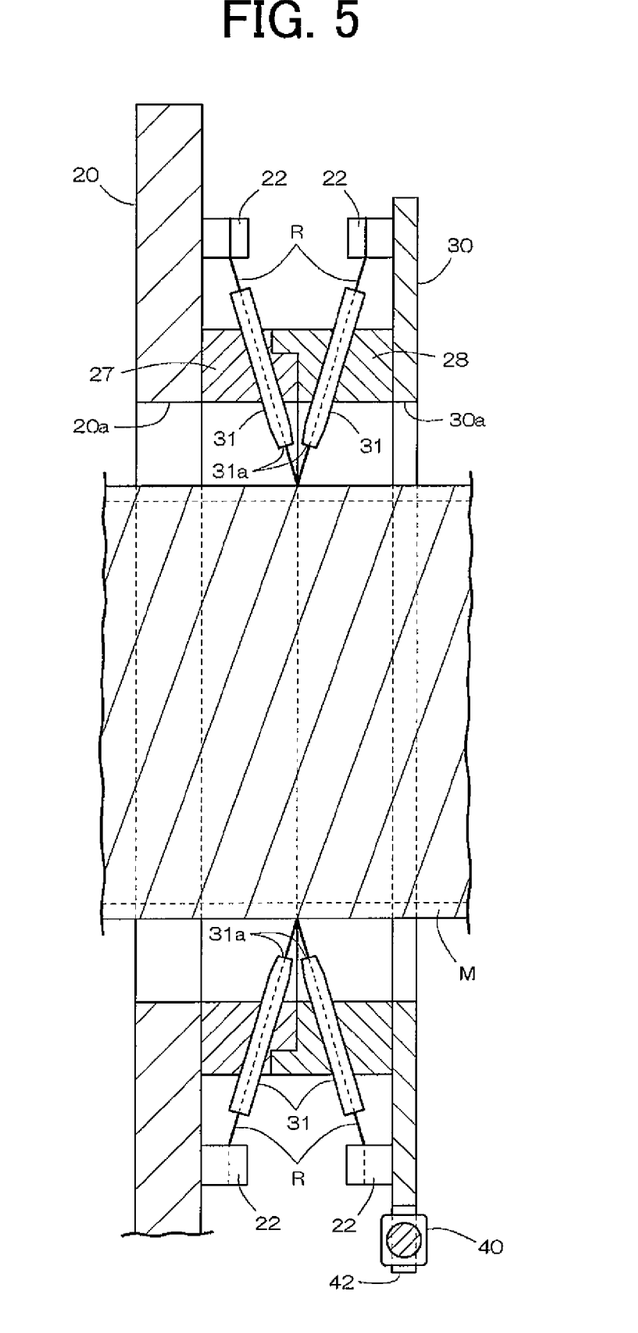
FIG. 5 is a cross-sectional view taken along line B-B of FIG. 4.

Guide ring 27 is fixed at a circumferential edge wall of the opening 20a formed in the fixed frame 20, and guide ring 28 is coupled in a freely rotating manner with respect to the fixed guide ring 27. An auxiliary frame 30 is fixed at the side end of the guide ring 28 on the movable side. A circular opening 30a allowing the reciprocating movement of the mandrel M is formed at a middle of the plate surface of the auxiliary frame 30, and the guide roller 22 is arranged on a plate surface at the periphery of the opening 30a (FIG. 5).

The guide tube 31 is a linear round tube that is screwed and fixed to guide rings 27, 28, and that is tilted relative to guide rings 27, 28. In the guide ring 27 on a fixed side, the guide tube 31 is tilted such that tube exit 31a is directed towards an inner side of an inner surface of the guide ring 28 on the movable side. In the guide ring 28 on the movable side, the guide tube 31 is tilted such that the tube exit 31a is directed towards an inner side of an inner surface of the guide ring 27 on the fixed side. Thus, because the guide tube 31 in each guide ring 27, 28 has the same tilt angle and opposite tilting directions, the tube exits 31a are as close as possible to each other. The tube exits 31a are thus adjacent at a middle portion in an adjacent direction of guide rings 27, 28 in a first state.

Figure 6:
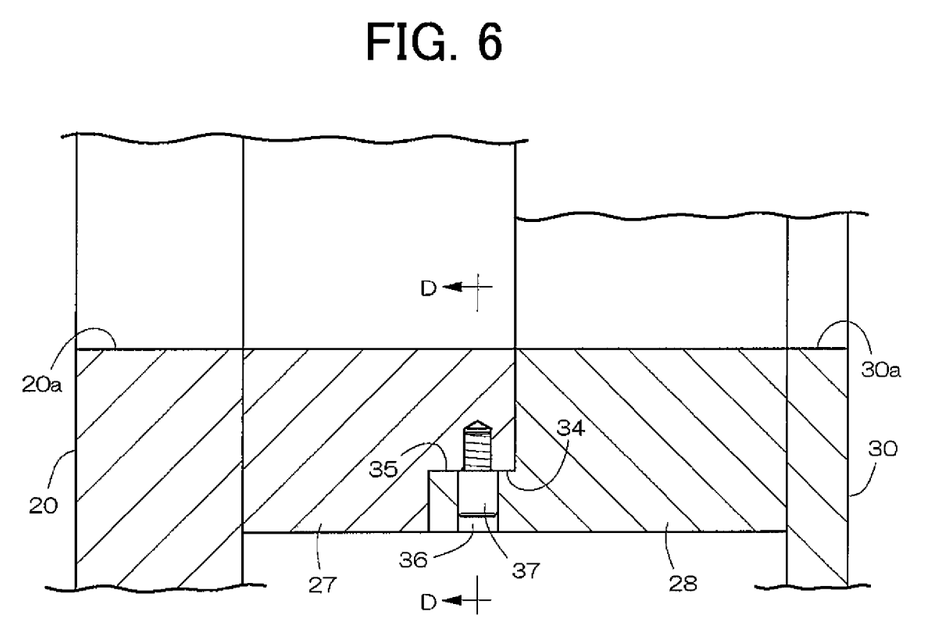
FIG. 6 is a cross-sectional view taken along line C-C of FIG. 8.
Figure 7:
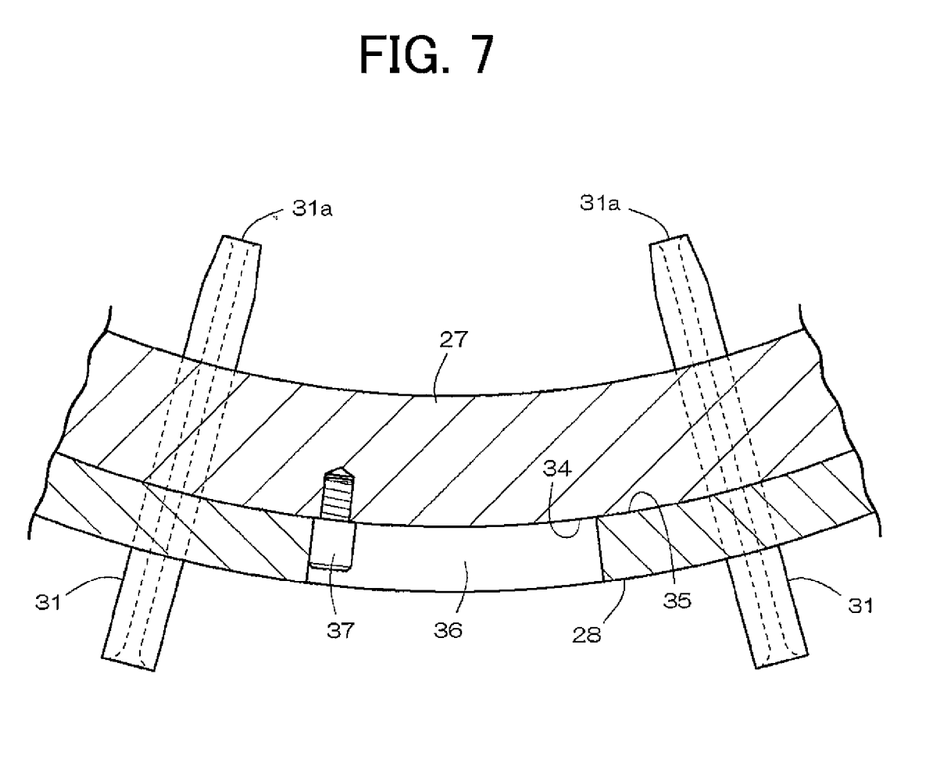
FIG. 7 is a cross-sectional view taken along line D-D of FIG. 6.
Figure 8:
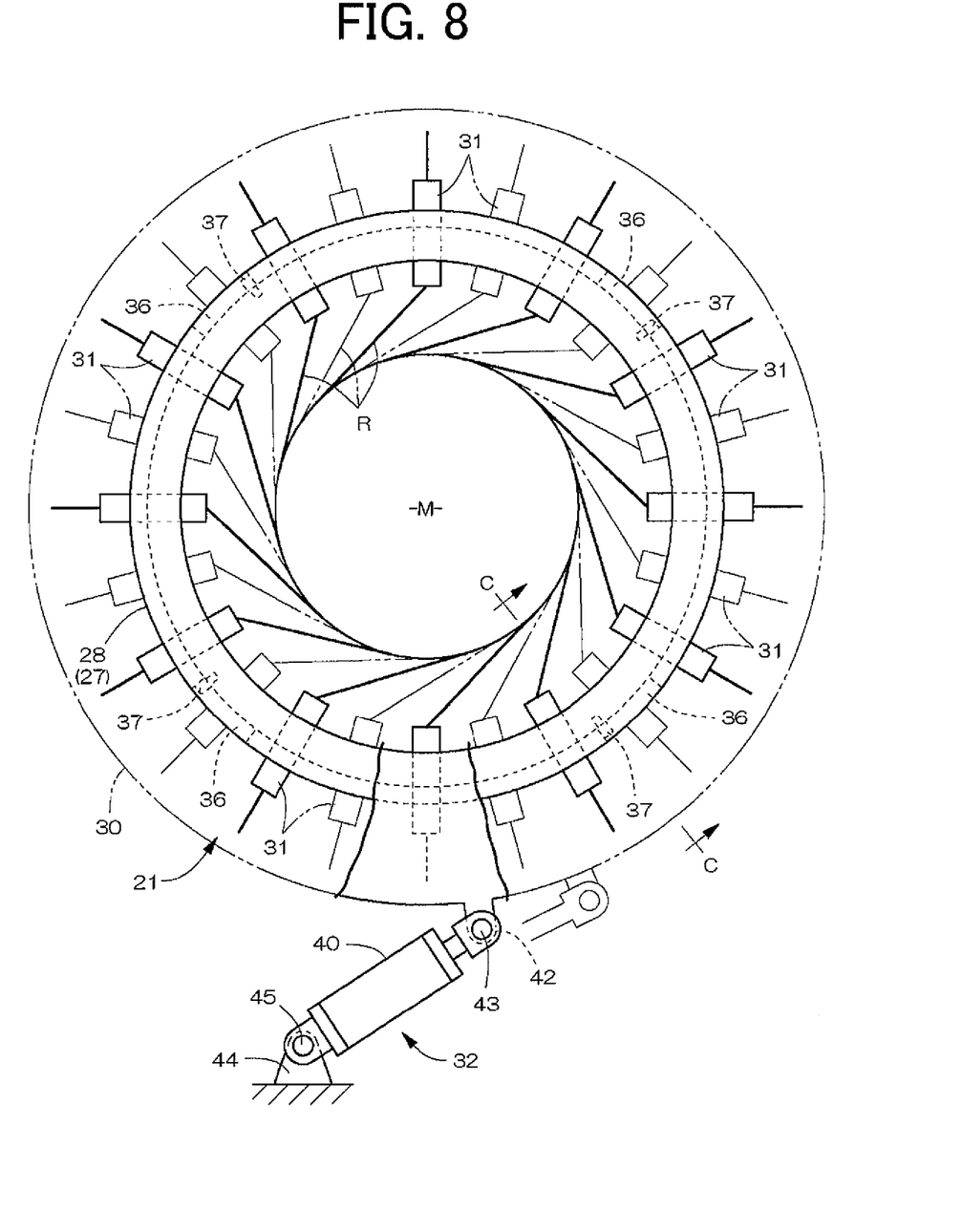
FIG. 8 is a side view of a state in which the phase of the guide ring is shifted.

The guide rings 27, 28 adjacently arranged along an axis center of the mandrel M are coupled as shown in FIG. 6. A coupling shaft 34 having a smaller diameter than the ring circumferential surface is formed at a joining part of the guide ring 27 on the fixed side, and a coupling hole 35 externally fitted to the coupling shaft 34 is formed on an inner surface of a joining part of the guide ring 28 on the movable side. A positioning groove 36 opened at the coupling hole 35 is formed at four locations on the periphery of the joining portion of the guide ring 28 on the movable side (FIGS. 7 and 8). The rings 27, 28 are coupled in a relatively rotatable manner by joining the rings 27, 28, fitting the coupling hole 35 and the coupling shaft 34, and then screwing a hexagon socket head bolt 37 inserted to the positioning groove 36 to the coupling shaft 34. The guide ring 28 on the movable side is thereby coupled so as to be inseparable with respect to the guide ring 27 on the fixed side, and to be reciprocating rotation displaceable within a range defined by the positioning groove 36 and the hexagonal socket head bolt 37.

The phase switching structure 32 is configured by an air cylinder (operator) 40 switching the guide ring 28 on the movable side, and a positioning structure arranged between the adjacent guide rings 27, 28. As shown in FIG. 8, an end of a piston rod of the air cylinder 40 is coupled to a bracket 42 arranged at a lower part of the auxiliary frame 30 with a pin 43, and an end on the cylinder side of the air cylinder 40 is coupled to a bracket 44 with a pin 45. The latter bracket 44 is fixed to the fixed frame 20 or the mount 1. Thus, when the piston rod is extendedly displaced as shown with an imaginary line from a state shown with a solid line in FIG. 8, the auxiliary frame 30 and the guide ring 28 on the movable side are rotatably operated in a counterclockwise rotating direction. When the piston rod is retreated into the cylinder, the auxiliary frame 30 and the guide ring 28 on the movable side are rotatably operated in a clockwise rotating direction. The positioning groove 36 and the hexagonal socket head bolt 37 serve as the positioning structure.

As described above, the phase of the guide tube 31 arranged in the guide rings 27, 28 is switched between two states by coupling the guide rings 27, 28 in a relatively rotatable manner, and rotatably operating the guide ring 28 on the movable side with the phase switching structure 32. In a first state, the phase position of the guide tube 31 in each guide ring 27, 28 is matched, as shown in FIG. 4. In a second state, the phase position of the guide tube 31 in each guide ring 27, 28 is evenly shifted in the circumferential direction (state shown with solid line and imaginary line in FIG. 8). The amount of shift of the guide tube 31 when switched from the first state to the second state is half of the adjacent pitch in the circumferential direction of the guide tube 31 in each guide ring 27, 28. In the second state, the number of guide tubes 31 visually recognized when facing the fixed frame 20 is twenty-four.

In the first state, the supplying number of fiber bundles R is twelve in a pseudo manner since the fiber bundle R is supplied from the guide tube 31 at the same phase position. In the second state, helical winding is carried out with a supplying number that is twice the number of fiber bundles R in the first state since the phase of the guide tube 31 in each guide ring 27, 28 is shifted.

Numerous fiber bundles can be simultaneously wound without overlapping each other if the winding angle of the fiber bundle R is small. However, the number of fiber bundles that can be simultaneously wound without the adjacent fiber bundles R overlapping each other decreases as the winding angle becomes larger. Therefore, when changing the winding angle of the fiber bundle R with respect to the mandrel M, the number of fiber bundles R to be supplied to the mandrel M can be changed by operating the guide ring 28 on the movable side with the phase switching structure 32, and switching the supply state of the fiber bundle R between the first and second states. Thus, a helical winding process with two different winding angles can be continuously carried out without the trouble of changing the arrangement by changing the supply state of the fiber R. The winding angle of the fiber bundle R is changed by selecting the drive rotation number of the mandrel M and the feeding speed of the supporting board 2, and is determined by the shape of the mandrel M, and the size and supplying number of the fiber bundles R.

As described above, the phase position of the guide tube 31 in each guide ring 27, 28 in the first state is matched. However, the position in the axis center direction of the guide tube 31 in guide rings 27, 28 tends to shift as each guide ring 27, 28 is adjacently arranged along the axis center of the mandrel M. In particular, as shown with an imaginary line in FIG. 1, the position of the tube center axis of each guide tube 31 may shift greatly in the axis center direction of the mandrel M if the guide tube 31 is radially attached along the diameter line of each guide ring 27, 28.

The positional shift influences the winding angle of the fiber bundle R fed from each guide tube 31. Specifically, the winding angle of the fiber bundle R fed and guided by the guide tube 31 of the guide ring 27 on the fixed side becomes larger than the winding angle of the fiber bundle R fed and guided by the guide tube 31 of the guide ring 28 on the movable side. The distance between the position at which the fiber bundle R externally contacts the mandrel M and the tube exits 31a of each guide tube 31 differs by such shift dimension.

Thus, a problem arises in the first state in which the winding angle of the fiber bundle R is large if the winding angles of the fiber bundles R supplied from the guide tubes 31 adjacent in the axis center direction of the mandrel M slightly differ. Since helical winding is carried out with the winding angle of the fiber bundle R supplied from each guide tube 31 being slightly different, the fiber bundle R is wound around the mandrel M without overlapping on the inside and the outside and while being shifted in the circumferential direction. As a result, bumps are formed on the surface of the wound layer. In the second state in which the winding angle is small, a helical wound layer without any practical problem can be formed since the influence of positional shift in the axis center direction of the guide tube 31 hardly appears.

In order to resolve the shift of the fiber bundle R in the first state, the tube exits 31a, 31a of each guide tube 31 arranged in each guide ring 27, 28 are arranged close at the middle portion in the adjacent direction of the rings 27, 28, as described above. The adjacent interval of the tube exits 31a is preferably as small as possible, but needs to have a margin gap so that the turning displacement of the guide ring 28 on the movable side can be smoothly performed.

The winding operation of the winding apparatus is described below. When carrying out hoop winding, the wrapping table 16 is positioned at one side end of the cylindrical part of the mandrel M, and the fiber bundle R fed from each bobbin 17 is fixed to the surface of the mandrel M with an adhesive tape. A plurality of fiber bundles R is arranged in parallel without a gap along the circumferential surface of the mandrel M. The frame 15 is moved towards the other side end of the cylindrical part of the mandrel M while rotatably driving the wrapping table 16 in this state to form a first hoop wound layer H1. The frame 15 is then reversed and moved to the one side end (winding start end side) of the cylindrical part of the mandrel M to form a second hoop wound layer H1. The winding process is repeated a necessary number of times to further form the hoop wound layer H1.

When forming a helical wound layer H2 on the outer surface of the hoop wound layer H1, the hoop winding device 3 is retreated to one side end of the mount 1, as shown in FIG. 2. The helical winding device 4 rotatably operates the guide ring 28 on the movable side with the air cylinder 40 to hold the same in the first state, and matches the phase position of the guide tube 31 in each guide ring 27, 28. The supporting board 2 is moved in parallel so that a basal end of the mouth part of the mandrel M faces the inner surface of the guide ring 27, 28 of the helical winding device 4, and the fiber bundle R pulled out from each guide tube 31 is fixed to the circumferential surface of the mouth part with an adhesive tape. Here, the fiber bundle R pulled out from the guide tube 31, which phase is matched in each guide ring 27, 28, is fixed to the circumferential surface of the mouth part while overlapping on the inside and the outside.

After this preparation task is complete, the supporting board 2 is moved at a constant speed while rotatably driving the chuck 10 and the mandrel M to form the helical wound layer H2 on the outer surface of the hoop wound layer H1. The supply state of the fiber bundle R in this case is the first state, and thus the helical winding is carried out in a state where the winding angle of the fiber bundle R is large. In the present invention, the tube exits 31a of the guide tubes 31, which phases are matched, are brought as close as possible. Therefore, the fiber bundles R supplied from the guide tubes 31, which phases are matched, can be wound while overlapping on the inside and the outside even if the helical winding is carried out with a large winding angle, where each fiber bundle R does not shift in the circumferential direction, and the helical wound layer H2 can be appropriately formed. FIG. 3 shows a state in which the hoop wound layer H1 is formed on the surface of the mandrel M on the right side of the helical winding device 4, and the helical wound layer H2 is formed on the outer surface of the hoop wound layer H1 on the left side of the helical winding device 4.

The helical wound layer H2 of two layers are formed on the inside and the outside when the entire mandrel M is passed through the helical winding head 21 in one direction. Similarly, the helical wound layer H2 of two layers are formed on the outer surface of the helical wound layer H2 by carrying out the helical winding while moving the supporting board 2 in the direction opposite to the direction until now. The winding process is repeated a necessary number of times to further form the helical wound layer H2.

A helical winding process having a small winding angle can be continuously carried out in continuation to a helical winding process having a large winding angle. In this case, the guide ring 28 on the movable side is displaced in the clockwise rotating direction by the air cylinder 40 and held in the second state, and the phase position of the guide tube 31 in each guide ring 27, 28 is differed. All fiber bundles R are arranged in parallel without a gap along the circumferential surface of the helical wound layer H2 by evenly shifting the phase position of each guide tube 31 in the circumferential direction. The helical wound layer H2 of small winding angle can be formed by moving the supporting board 2 at a constant speed in one direction while rotatably driving the chuck 10 and the mandrel M in the above state.

The helical wound layer H2 of small winding angle is similarly formed by performing the helical winding while moving the supporting board 2 in the direction opposite to the direction until now. After the helical winding process is complete, the fiber bundle R is cut, and the cut end is fixed to the mouth part with an adhesive tape. A pressure container including the reinforcement layer and the mandrel M is thereby obtained by alternately performing hoop and helical winding in the above manner, detaching the mandrel M from the supporting board 2 and applying a heating process to the detached mandrel M to cure the resin impregnated in the fiber bundle R.

Figure 9:
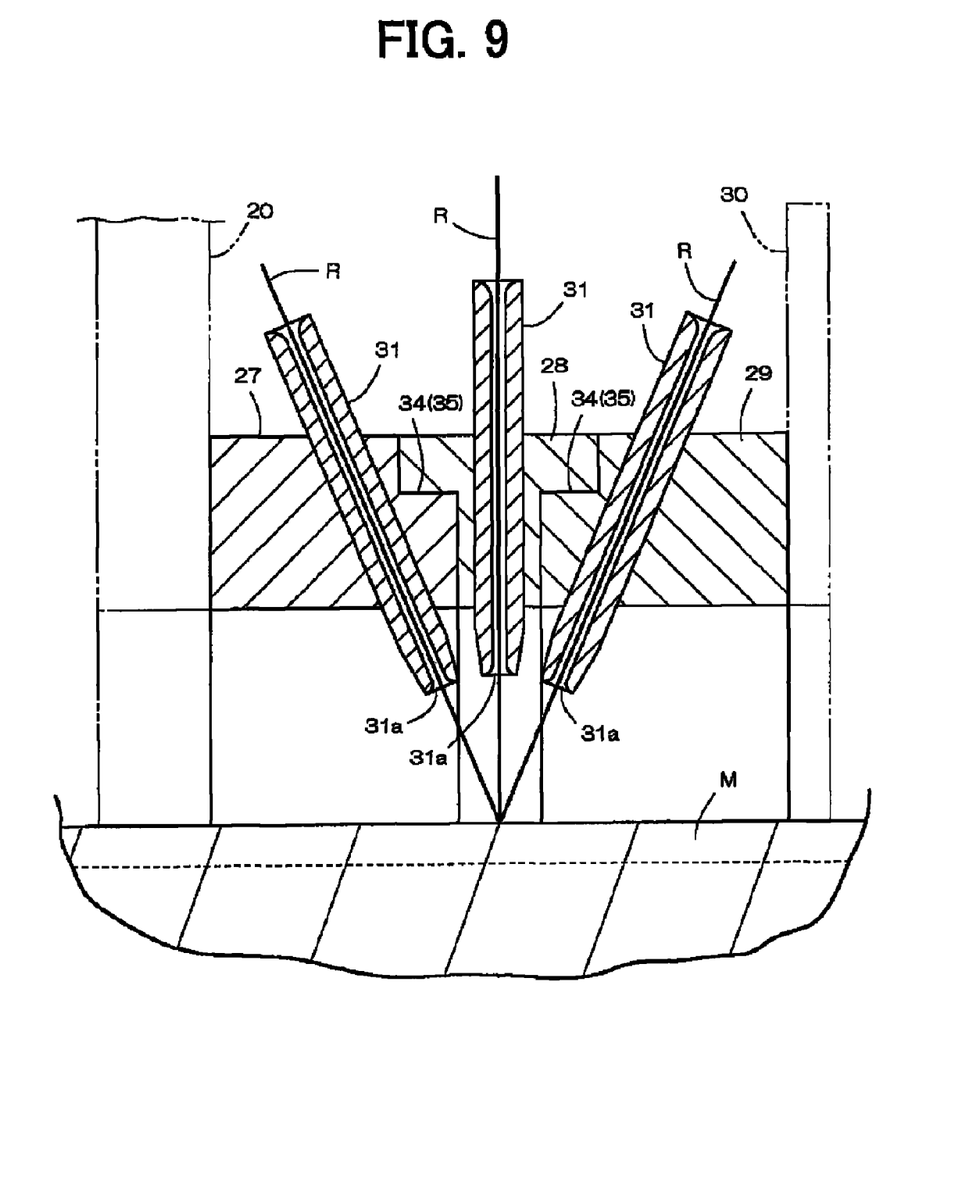
FIG. 9 is a cross-sectional view showing another example of a helical winding head according to the present invention.

FIG. 9 shows another example of the helical winding head 21. The helical winding head 21 comprises three adjacently arranged guide rings 27, 28, 29, a group of guide tubes 31 arranged at equal intervals along the circumferential direction of rings 27, 28, 29, and phase switching structure 32 rotatably operating the guide ring 29 at the right side end. Guide ring 27 is at the left end facing FIG. 9 and is fixed at the circumferential edge wall of the opening 20a formed in the fixed frame 20. The guide ring 28 is in the middle and is coupled in a freely rotating manner with respect to the fixed guide ring 27. The guide ring 29 is at the right end facing FIG. 9 and is coupled in a freely rotating manner with respect to the guide ring 28 at the middle.

The middle guide ring 28 and the fixed guide ring 27, as well as the right end guide ring 29 and the middle guide ring 28, are respectively coupled in a relatively rotatable manner by the coupling structure described in FIGS. 6 and 7. The amount of shift of the guide tube 31 in the second state is one third of the adjacent pitch in the circumferential direction of the guide tube 31 in guide rings 27, 28, 29, and thus the circumferential length of the positioning groove 36 is formed shorter by that much. The auxiliary frame 30 is fixed to the side end of the guide ring 29 at the right end, a circular opening 30a is formed at the middle of the plate surface of the auxiliary frame 30, and the guide roller 22 is arranged on the plate surface at the periphery of the opening 30a, The guide roller 22 guiding the fiber bundle R towards the middle guide ring 28 is arranged on the fixed frame 20.

In this example, the tube exits 31a of guide tubes 31 arranged in guide rings 27, 28, 29 are arranged close at the middle in a width direction of the inner surface of the guide ring 28 at the middle to resolve the shift of the fiber bundle R in the first state. Specifically, a guide tube 31 is radially attached along the diameter line of the guide ring 28 in the middle guide ring 28, and guide tubes 31 are tilted in opposite directions to each other in guide rings 27 and 29. Thus, the tube exits 31a of the three adjacent guide tubes 31 are brought close to each other.

According to the helical winding head 21 configured as above, two guide rings 28, 29 on the movable side are rotated with the phase switching structure 32 to be switched between the first state in which the phases of each guide tube 31 are matched and the second state in which the phases of each guide tube 31 are evenly shifted. The air cylinder 40 rotatably operates the guide ring 29 at the right end through the auxiliary frame 30, where the guide ring 28 at the middle is rotatably operated after the guide ring 29 is rotatably displaced to a limiting position. This is the same as in the previous example, and thus the same reference numerals are denoted for the same members, and repeat description thereof is omitted.

When guide rings 27, 28, 29 are switched to the first state, the phases of guide tubes 31 are matched, and the three tube exits 31a are brought close along the axis center direction of the mandrel M. Thus, the winding angle of the fiber bundle R fed from each guide tube 31 with respect to the mandrel M is substantially matched, so that the three fiber bundles R can be wound while being overlapped on the inside and the outside. Therefore, the wound layer can be appropriately formed even if the helical winding is performed in a state of a large winding angle. The winding process can be more efficiently carried out since the helical winding is performed while simultaneously supplying the three fiber bundles R. When guide rings 27, 28, 29 are switched to the second state, the phases of the three tube exits 31a are evenly shifted, and the helical winding is performed with a small winding angle. The winding process can be efficiently performed especially when the diameter dimension of the mandrel M is large.

Figure 1:
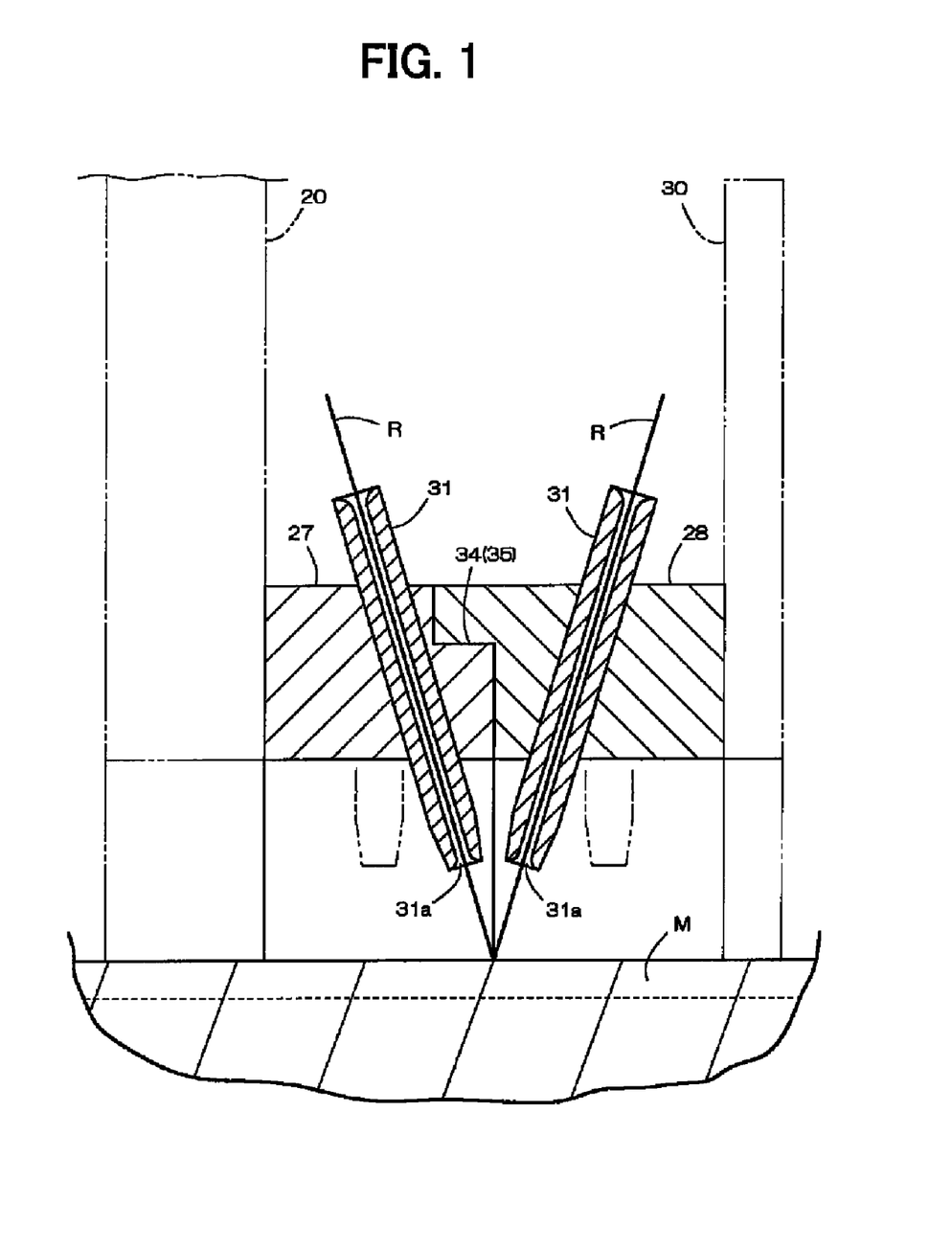
FIG. 1 is a cross-sectional view showing a schematic structure of a helical winding head according to the present invention.

In the example shown in FIG. 1, guide tubes 31 attached to the guide rings 27, 28 on the fixed and movable sides are tilted in opposite directions to each other, but this is not necessary. For instance, the guide tube 31 attached to the guide ring 27 on the fixed side may be radially attached along the diameter line of the guide ring 27, similar to the guide tube 31 positioned at the middle in FIG. 9. Then, only the guide tube 31 attached to the guide ring 28 on the movable side is greatly tilted towards the former guide tube 31, so that the tube exits 31a are brought close. In this case, the tube exits 31a are arranged close at the inner side of the inner surface of the guide ring 27 on the fixed side. Only the guide tube 31 attached to the guide ring 27 on the fixed side may be greatly tilted, so that the tube exits 31 are arranged close at the inner side of the inner surface of the guide ring 28 on the movable side.

In addition, the guide tube 31 may not be formed in a linear tubular form, and the side of the tube exit 31a may be bent towards the side of the adjacent guide tube 31. The phase switching structure 32 may be arranged between adjacent guide rings 27, 28. Instead of an air cylinder, a solenoid, an electric cylinder, or the like may be applied to the operator 40 rotatably operating the guide ring 28 on the movable side. The positioning structure may be formed as a dedicated structure separate from the coupling structure of each guide ring.

While the present invention has been described with respect to embodiments thereof, it may be modified in numerous ways and may assume many embodiments other than those specifically set out and described above. Accordingly, the appended claims cover all modifications that fall within the true spirit and scope of the present invention.

What is claimed is:

1. A filament winding apparatus having a helical winding device that winds a fiber bundle around a circumferential surface of a mandrel, wherein
    the helical winding device includes a fixed frame arranged upstanding on a mount, and a helical winding head supported by the fixed frame;
    the helical winding head includes a plurality of guide rings adjacently arranged along an axis center of the mandrel and coupled in a relatively freely rotating manner in a circumferential direction, guide tubes arranged at equal intervals along the circumferential directions of the guide rings, and a phase switching structure rotating a guide ring on a movable side;
    the guide rings are switchable between a first state in which phase positions of the guide tubes in the guide rings are matched and a second state in which the phase positions of the guide tubes in the guide rings are evenly shifted in the circumferential direction by a phase switching structure; and
    tube exits of the guide tubes attached to the guide rings are arranged close along an axis center direction of the mandrel in the first state.

2. The filament winding apparatus according to claim 1, wherein
    one guide ring is fixed and supported at the fixed frame, and any other guide rings are coupled in a freely rotating manner in the circumferential direction with respect to the fixed and supported guide ring; and
    the phase switching structure includes an operator switching one of the guide rings that can be rotatably displaced, and a positioning structure arranged between the adjacent guide rings.

3. The filament winding apparatus according to claim 2, wherein there are two guide rings.

4. The filament winding apparatus according to claim 2, wherein there are three guide rings.

5. The filament winding apparatus according to claim 1, wherein
    the guide tubes are formed in a linear tubular form and are attached and fixed to each guide ring; and
    a guide tube attached to at least one guide ring is tilted so that the tube exits are arranged close.

6. The filament winding apparatus according to claim 5, wherein guide tubes attached to two guide rings are tilted in opposite directions.

7. The filament winding apparatus according to claim 6, wherein the tilt angles of the guide tubes are the same.

8. The filament winding apparatus according to claim 1, wherein the guide rings are coupled in a relatively freely rotating manner by fitting a coupling shaft attached to one of the guide rings into a positioning groove formed in another of the guide rings.

9. The filament winding apparatus according to claim 2, wherein the operator is an air cylinder.

10. The filament winding apparatus according to claim 1, wherein the number of fiber bundles supplied in a pseudo manner to the mandrel is changed by switching between the first and second states.

11. The filament winding apparatus according to claim 1, wherein the number of fiber bundles supplied in a pseudo manner to the mandrel in the second state is twice the number of fiber bundles supplied in a pseudo manner to the mandrel in the first state.

* * * * *